United States Patent [19]

Wirth

[11] 4,405,218
[45] Sep. 20, 1983

[54] SHUTTERLESS OPTICAL SYSTEM FOR VIEWING MOTION PICTURES

[76] Inventor: John L. Wirth, 408 Greenwood Pl., Syracuse, N.Y. 13210

[21] Appl. No.: 288,464

[22] Filed: Jul. 30, 1981

[51] Int. Cl.$^3$ .............................................. G03B 41/06
[52] U.S. Cl. .................................... 352/108; 352/198
[58] Field of Search .............. 352/105, 108, 198, 109, 352/110, 106, 107, 203

[56] References Cited

U.S. PATENT DOCUMENTS

| 1,771,509 | 7/1930 | Ott | 352/198 |
| 2,255,892 | 9/1941 | Leventhal | 352/106 |
| 2,843,006 | 7/1958 | Tyler | 352/109 |
| 4,187,008 | 2/1980 | Keznickl | 352/108 |

FOREIGN PATENT DOCUMENTS

| 464509 | 8/1928 | Fed. Rep. of Germany | 352/108 |
| 154222 | 12/1921 | United Kingdom | 352/108 |

Primary Examiner—Monroe H. Hayes

[57] ABSTRACT

A shutterless optical system for viewing motion pictures, especially suitable for an 8 mm viewer, is disclosed in which the film moves continuously in a circular path around the optical center of a lens. The motion of the film is compensated by a rotating mirror wheel—a disk or wheel of outward-facing flat mirrored surfaces. The error in one dimension ordinarily resulting from the curvature of the film path is avoided by use of a line light source and a lens between the source and the film.

2 Claims, 4 Drawing Figures

SHUTTERLESS OPTICAL SYSTEM FOR VIEWING MOTION PICTURES

SHORT STATEMENT OF THE INVENTION

The invention is an optical system for viewing motion pictures which has no shutter, in which the film moves in a uniform, continuous motion. The film moves in a circular path around the optical center of a lens. The motion of the film is exactly compensated, to produce a succession of motionless images, by a rotating "mirror wheel". This is a wheel or disk that rotates on an axis and has outward-facing flat mirrored surfaces such that sections of the mirrored surfaces at planes perpendicular to the axis are congruent regular polygons. Ordinarily, that is, if the film is illuminated by a two-dimensional diffuse source, the curvature of the film path would produce an imaging error in one dimension. The invention avoids this error by employing, instead of a two-dimensional diffuse source, a line source and a lens between the line source and the film.

BACKGROUND OF THE INVENTION

In prior optical systems for the viewing of motion pictures (except in the optical system of the inventor's pending U.S. application Ser. No. 222,354), the motion picture film advances intermittently rather than continuously. A frame of the film, motionless, occupies a position centered on the axis of an imaging lens for a period of time. The film is then rapidly advanced until the next frame is brought to this position. This frame, motionless, then occupies this position for a period of time; and so on.

Usually (an exception is the viewing device described in U.S. Pat. No. 3,264,051), the illumination of the film is interrupted by a shutter while the film is advanced.

DISADVANTAGES OF PRIOR SYSTEMS

The prior viewing systems, whether having a shutter or not, produce a flicker in the moving image. The flicker may be only barely perceptible but may nevertheless subtract from the illusion of continuous motion. In the case of a shutter system, the flicker is produced, of course, by the interruption of the illumination of the film by the shutter. In the case of the shutterless device described in U.S. Pat. No. 3,264,051, a flicker is produced by the intermittent advance of the film under continuous illumination.

A further disadvantage of the prior systems is that mechanisms effecting intermittent advance of the film require a complicated film path and hence a threading process accomplished with an end of the film free, unattached to a reel. Such a threading process is incompatible with the realization of a viewer which is the exact analogue of an audio or video cassette magnetic tape player. Such a viewer is understood to be one in which loading is achieved by slipping the cassette into place without the film having to be threaded, the film being permanently affixed to the two reels of the cassette, and in which rewinding is achieved by reversing the direction of the film without the film having to be unthreaded.

A further disadvantage of the prior systems, with intermittent film-advancing mechanisms, is that these mechanisms are noisy, due to the presence of elements of these mechanisms which are in intermittent motion.

A further disadvantage of the prior systems is that their intermittent film-advancing mechanisms subject the motion picture print to severe bending forces and to sharp, jerking forces applied at the mechanically weak sprocket holes. This results in considerable wear to the print and so limits its useful life.

ADVANTAGES OF THE DISCLOSED SYSTEM

The above disadvantages of previous systems are overcome by the present system:

The present system reduces flicker by producing a succession of images in which there is at no time an interruption of the illumination of any point of the viewing field (see "Character of Succession of Images" below).

The film path in the present system is simple enough to allow the film to be loaded and rewound as is the tape of a tape cassette recorder.

As the film-advancing mechanism of the present system has no elements in intermittent motion, it is as quiet as the tape-advancing mechanism of a tape cassette recorder.

The film-advancing mechanism of the present invention, in producing a continuous motion of the film along a path only slightly curved at one point, subjects the film to no severe mechanical forces and so reduces film wear.

ANGLE CONVENTIONS

Unless otherwise stated, the magnitudes of angles are understood to be in degrees, not radians.

Angles are directed angles. If directed in the counter-clockwise direction, they are positive; if in the clockwise, negative. Some are indicated in diagrams by arrows, which show the lines between which the angle is to be measured and its direction. Some angles, on the other hand, are specified without the use of a diagram. Suppose AB and BC are two lines, not perpendicular, intersecting at B. In the expression "the angle AB makes with BC," AB is the line that would be at head of the arrow, BC the one at the tail, and the angle the one whose absolute value is less than 90°. The expression "angle point A makes with BC at B" is understood to specify the angle AB makes with BC.

DESCRIPTION OF FIG. 1

Figure 1:
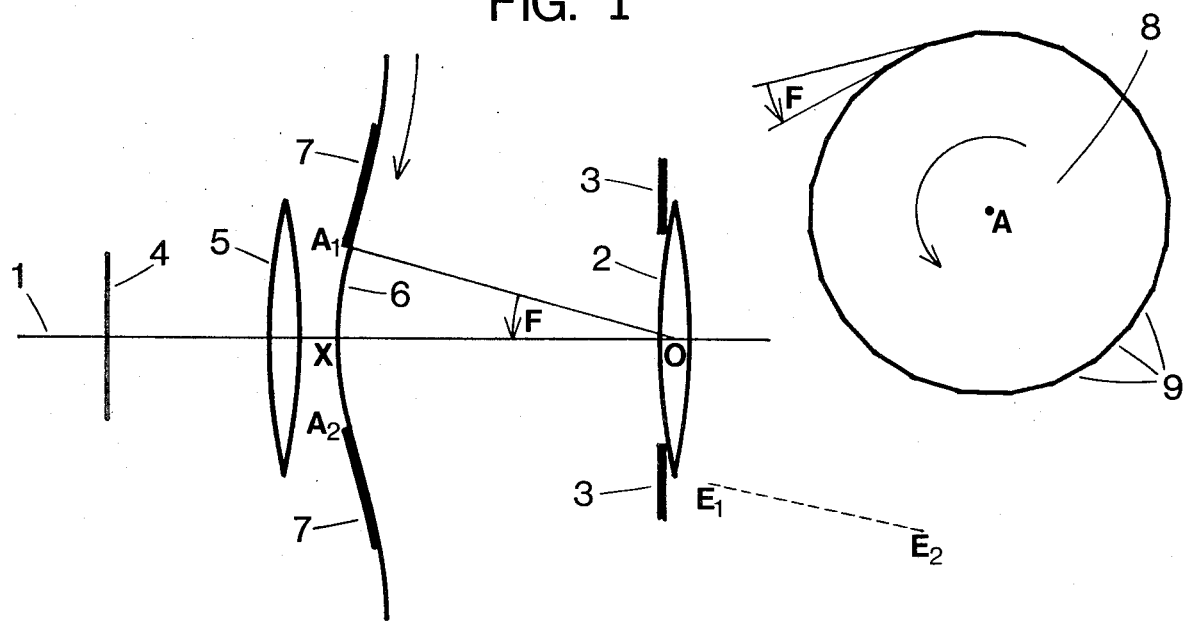
FIGS. 1 and 3 are schematic diagrams of the invention, vertical and horizontal sections, respectively. They show the configuration of light source, motion picture film, lenses, and "mirror wheel," as more fully described below.

FIG. 1 is a schematic diagram of the invention, a vertical section through the optical axis, 1, of 2, a convergent lens.

Lens 2 is called hereafter in this specification the "imaging lens." 3 is the aperture of lens 2. 4 is a vertical light source, for instance a straight-line filament. 5 is a convergent lens, called hereafter in this specification the "light source lens." Light source 4 lies in the focal plane of light source lens 5. 6 is the motion picture film.

7 is a stop in which there is an aperture between points $A_1$ and $A_2$. O is the optical center of imaging lens 2.

Motion picture film 6 moves in continuous and uniform motion downward (as indicated by the arrow). Within the aperture of stop 7, film 6 moves in a circular path, with the center of the circle point O. Here, it lies substantially in the focal plane of imaging lens 2 (the focal plane may be curved concave toward the right). X is the point at which film 6 intersects optical axis 1. F is the angle line XO makes with line $A_1O$, that is, half the angle subtended by the aperture in stop 7 at point O. The length of film 6 between $A_1$ and $A_2$ is equal to the frame height. The "frame height" is understood to be the height of the image area of one frame plus the width of film, if any, separating adjacent frames. The frame height is thus the length of film separating spatially corresponding points of adjacent frames.

8 is a mirror wheel. A "mirror wheel" is understood to be a wheel or disk that rotates on an axis and has outward-facing flat mirrored surfaces such that sections of the mirrored surfaces at planes perpendicular to the axis are congruent regular polygons. The axis of mirror wheel 8, A, is perpendicular to the plane of FIG. 1 and the section of mirror wheel 8 made by the plane of FIG. 1 is a regular polygon. Mirror wheel 8 rotates counterclockwise around axis A, as indicated by the arrow. 9 are three of the mirrored surfaces of mirror wheel 8. A mirrored surface makes angle F, the angle stated above, with the mirrored surface adjacent in the clockwise direction. Mirror wheel 8 thus has 360/F mirrored surfaces (F being required to be such that this is an integer).

Dashed line $E_1E_2$ indicates a suitable position of the entrance pupil of the "adjunct optical system." The latter is understood to be the optical system used in conjunction with the invention which the light enters after being reflected from mirror wheel 8. This may be a telescopic eyepiece, a projection lens system, or the eye.

Film 6 moves, within the aperture in stop 7, with constant angular velocity counterclockwise around optical center O of lens 2, and mirror wheel 8 rotates counterclockwise with constant angular velocity. Let V be the angular velocity of film 6; then the angular velocity of mirror wheel 8 is V/2.

Operation of the Invention in the Vertical Dimension, as Shown in FIG. 1.

At the entrance pupil at $E_1E_2$, the invention produces from the successive frames of motion picture film 6 a succession of images, at infinity, each stationary. This process is described below.

In the vertical dimension, shown in FIG. 1, line light source 4 and light source lens 5 produce the same illumination of film 6 than would a diffuse light source. That is, in this dimension, each point of the film is illuminated by rays making all angles with the film within a range of angles. Each point of film 6 thus gives rise to a pencil of rays diverging from the point. Imaging lens 2 transforms the divergent pencil into a parallel pencil, since film 6 is at its focal plane. If, at a certain instant, a point of the film makes angle J with optical axis 1 at point O, the parallel pencil makes the same angle J with it, that is to say, eacy ray of the pencil makes this angle with it. The parallel pencil is then reflected from one or more of the mirrored surfaces of mirror wheel 8.

Figure 2:
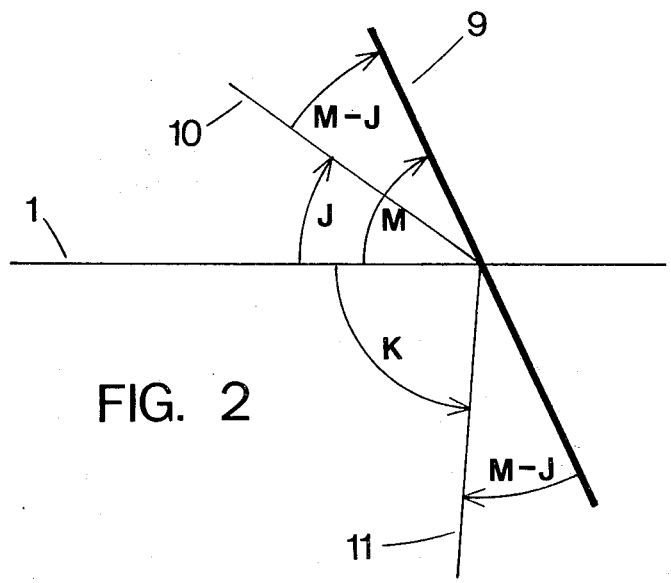
FIG. 2 is a diagram, of rays of light and a mirrored surface of the mirror wheel, aiding in the description of the operation of the invention in the vertical dimension.

Let M be the angle made with optical axis 1 by a mirrored surface that reflects the parallel pencil. Consider the parallel pencil reflected by the mirrored surface and the angle it makes with optical axis 1. In FIG. 2, 1 is the optical axis, 9 the mirrored surface, 10 a ray making angle J with optical axis 1, a ray of the incident parallel pencil, and 11 is this ray after reflection by mirrored surface 9. Mirrored surface 9 makes angle M−J with ray 10, and so reflected ray 11 makes this angle with mirrored surface 9. The angle ray 11 makes with optical axis 1, K, is therefore $$180+J+2(M-J)=180+J+2M-2J=180+2M-J \quad (1)$$

Consider now the angle the reflected pencil makes with optical axis 1 after T seconds have ellapsed. It is shown that this angle is invariant, remaining 180+2M−J.

Film 6 moves counterclockwise around point O with angular velocity V, so a point of film 6 rotates through angle TV in T seconds. The point which made angle J with optical axis 1 at point O now makes angle J+Tv, and this is the angle the parallel pencil incident on the mirrored surface makes with optical axis 1. The mirror wheel rotates counterclockwise with angular velocity V/2, so the mirrored surface which made angle M with optical axis 1 makes angle M+TV/2 after T seconds. The angle the reflected pencil makes with optical axis 1 is computed, then, by substituting J+TV for J and M+TV/2 for M in equation (1). This is $$180+2(M+TV/2)-(J+TV)=180+2M+TV-J-TV$$

This is 180+2M−J, as was to be shown.

Thus, a point of the film, as it moves continuously within the aperture of stop 7, gives rise, in conjunction with imaging lens 2 and rotating mirror wheel 8, to a parallel pencil whose angle with optical axis 1 does not vary. That is, it gives rise to a point of a motionless image at infinity.

The above is true for a given point of film 6, of course, only for those intervals of time T for which the point of the film still lies within the aperture of stop 7. Let $T_1$ be the time required for a point of film 6, initially making angle J with optical axis 1 at point O, to reach the bottom of the aperture. The point has rotated through angle $T_1V$, so that $J+T_1V$ must be equal to F, the angle the bottom of the aperture, at $A_2$ in FIG. 1, makes with optical axis 1 at point O: $J+T_1V=F$, or $T_1=(F-J)/V$. After the same interval of time, the surface of the mirror wheel which initially made angle M with optical axis 1 at point O now makes angle $M+T_1V/2=M+[(F-J)/V](V/2)=M+(F-J)/2$. The angle the reflected parallel pencil makes with optical axis 1 is, as shown above, 180+2M−J. Consider the point of the succeeding frame spatially corresponding to the stated point. When the stated point has reached the bottom of the aperture in stop 7, at $A_2$, the corresponding point of the succeeding frame has reached the top of the aperture, at $A_1$. Consider the parallel pencil produced by the latter point after it is reflected by a mirrored surface of mirror wheel 8, and the angle it makes with optical axis 1. It is shown that after this is reflected by the mirrored surface adjacent in the clockwise direction to the one now making angle M+(F−J)/2 with optical axis 1, the angle is also 180+2M−J.

The point of the succeeding frame, at $A_1$, makes angle −F with optical axis 1 at point O, and the stated mirrored surface makes angle M+(F−J)/2−F=M−(F+J)/2, so the angle is computed by substituting these qualities for J and M, respectively, in (1). This is $$180 + 2[M-(F+J)/2] + F$$

which is $180+2M-J$, which was to be shown.

Thus, the effect of moving motion picture film 6, imaging lens 2 and mirror wheel 8 may be described as follows. As a point of a frame rotates counterclockwise around point O, it produces, until it reaches the bottom of the aperture in stop 7, a parallel pencil, reflected from one mirrored surface of mirror wheel 8, whose angle with optical axis 1 does not vary. This is a motionless point of an image at infinity. At the instant when the point reaches the bottom of the aperture and is no longer illuminated and so ceases to produce the parallel pencil, the spatially corresponding point of the succeeding frame, just entering the aperture and just then beginning to be illuminated, produces a parallel pencil, reflected from the adjacent mirrored surface, making the same angle with optical axis 1. That is, the image point at infinity produced by the first point is replaced by the image point at infinity produced by the spatially corresponding point of the succeeding frame.

CHARACTER OF SUCCESSION OF IMAGES

The above shows (assuming that as the film advances the horizontal positions of image points do not change, as will be shown below) that the invention produces a succession of motionless images of the following character. At a certain instant, the image at infinity of a single frame is produced. An instant later, a horizontal dividing line appears at the top of the viewing field. Below this line are image points of the frame; above it, instead of the image points of the frame there are the spatially corresponding points of the succeeding frame. The line moves downward, at a uniform velocity, replacing the image points of the frame by the spatially corresponding points of the succeeding frame. At a certain instant, the line wholly replaces the image points of the frame with the image points of the succeeding frame. An instant later, a dividing line appears at the top of the viewing field, replacing the image points of this succeeding frame with the image points of the next succeeding frame. The process continues in this way, producing a succession of motionless images of the frames.

CONFIGURATION FOR MAXIMUM AND STEADY LUMINANCE

Consider a mirrored surface of mirror wheel 8 which reflects rays focused to points of the viewing field. The mirrored surface reflects such rays while mirror wheel 8 rotates through a range of angles, that is, while the mirrored surface makes with optical axis 1 angles between a smallest and a largest angle. A desirable condition for every position of the mirrored surface while it makes these angles with optical axis 1 is as follows. For each parallel pencil produced by imaging lens 2 from a point of film 6, there are no points of the mirrored surface on which rays of the pencil are not incident. This insures that the image points within the viewing field are of maximum luminance and that the luminance of all image points of the viewing field remains approximately constant as mirror wheel 8 rotates.

Consider what the configuration must be in the vertical dimension to insure that this condition holds. Suppose at a certain instant the viewing field consists of image points from a single frame. Call this the "initial instant." At this instant, a certain one of the mirrored surfaces of the mirror wheel 8—call it the "initial mirrored surface"—reflects all the rays—call them "effective rays"—that are focused to points of the viewing field. Subsequent to the initial instant, this mirrored surface reflects some effective rays until the mirror wheel has rotated through angle F; that is, until it occupies the position occupied at the initial instant by the mirrored surface adjacent to it in the counterclockwise direction. Also, the mirrored surface adjacent to it in the clockwise direction begins to reflect effective rays at an instant after the initial instant. Thus, the condition stated above holds if at the initial instant there are no points of the mirrored surface and the two adjacent mirrored surfaces on which rays of the stated pencil are not incident.

The latter is true if the three stated mirrored surfaces lie within the triangle formed by the following three lines: 1. the line which is the intersection of the plane of lens 2 with the plane of the section of FIG. 1; 2. the line parallel to $A_1O$ through the point at the top of stop 3; 3. the line parallel $A_2O$ through the point at the bottom of stop 3.

ELIMINATION OF MULTIPLE IMAGES

Light from a point of film 6 is reflected from more than one mirrored surface of mirror wheel 8. If a point produces a parallel pencil of rays which makes angle K with optical axis 1 after reflection by one mirrored suface, the parallel pencil reflected by an adjacent mirrored surface makes angle $K=2F$ or $K+2F$. Thus, images adjacent to the desired image, above it and below it, are produced. The luminance of points of these images is less than that of points of the desired image because fewer rays fall on the adjacent mirrored surfaces due to the stopping of rays by stop 3 and/or fewer rays reflected from the adjacent mirrored surface pass through the entrance pupil of the adjunct optical system. To entirely eliminate the adjacent images, the adjunct optical system must be such as not to accept rays of divergence greater than 2F. This is the case if the adjunct optical system forms a real image at a plane where there is a stop of the appropriate size.

DESCRIPTION OF FIG. 3

Figure 3:
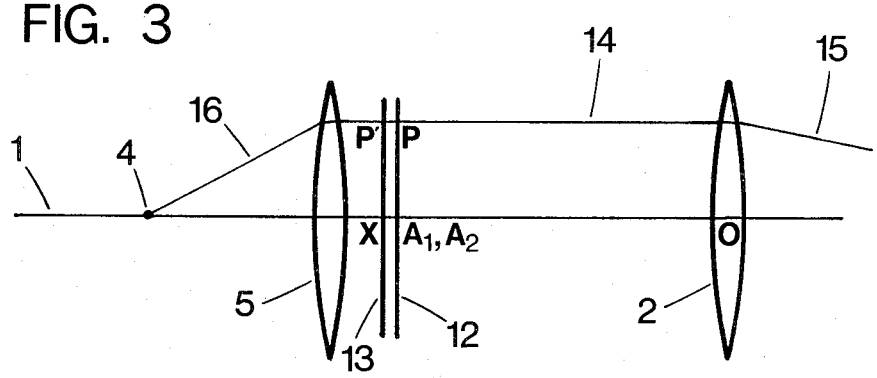

FIG. 3 is a schematic diagram, a horizontal section through optical axis 1 of lens 2, the same axis and lens as those numbered correspondingly in FIG. 1. Point O, 4 and 5 are also as in FIG. 1. 12 is the "horizontal position" of motion picture film 6 of FIG. 1 at the top of the aperture in stop 7 in FIG. 1. That is, it is the vertical projection of the points of the film at the top of the aperture onto the plane of FIG. 3. $A_1$ in FIG. 3 is the horizontal position of point $A_1$ in FIG. 1. 12 is also the horizontal position of the film at the bottom of the aperture in FIG. 1. The point designated $A_1$ in FIG. 3 is also designated $A_2$ as it is also the horizontal position of point $A_2$ in FIG. 1. 13 is film 6 of FIG. 1, that is, the section of film 6 at the plane of the figure. X is the same point as that denoted X in FIG. 1.

P is the horizontal position of a point of the film at the top of the aperture in FIG. 1. P' is the point after the film has rotated in the vertical dimension through angle F around the optical center O of lens 2, that is, when the point is at the plane of the figure. P' is the same horizontal distance, $\overline{P'X}$ (denoting the length of line $\overline{P'X}$), from optical axis 1 as is P, $\overline{PA_1}$ (which might also be written $\overline{PA_2}$). The "horizontal distance" of a point from optical axis 1 is understood to be the distance between optical axis 1 and the vertical projection of the point onto the plane of FIG. 3. After the film rotates through another angle F, the point reaches the bottom of the aperture in FIG. 1, and its horizontal position then is again the point designated by P. As the point advances from the top of the aperture in FIG. 1 to the bottom, its horizontal position is at a point of the line PP', and the point moves from P to P' and back to P.

Since line light source 4 is at the focal plane of light source lens 5, all rays from light source 4 after refraction by lens 5 are parallel to the plane of FIG. 1. 14 indicates the horizontal position of rays, parallel to the plane of FIG. 1, which are at distance $\overline{PA_1}$ from it. These rays after refraction by imaging lens 2 are in a single plane and have a single horizontal position. 15 designates this horizontal position. 16 is the horizontal position of rays which after refraction by light source lens 5 are at 14.

Operation of the Invention in the Horizontal Dimension, as Shown in FIG. 3

Let a point of the film be at the top of the aperture in FIG. 1, at P in FIG. 3. Consider what rays pass through the point. Since all rays from light source 4 after refraction by lens 5 are parallel to the plane of FIG. 1, these are all rays whose horizontal position is at 14. They constitute a fan-like configuration of rays—rays in a single plane passing through a single point and making all angles with each other of absolute magnitude up to a certain value. Call such a configuration a "fan of rays." Since the point of the film, at P, is substantially at the focal plane of imaging lens 2, rays of the fan of rays after refraction by lens 2 became rays, at 15, that are parallel. They constitute a ribbon-like configuration of rays—parallel rays in a single plane, and are called in this specification a "ribbon of rays." (What have been called above with respect to the vertical dimension pencils of rays and parallel pencils of rays are fans of rays and ribbons of rays, respectively.)

The ribbon of rays at 15 is then reflected by one or more of the mirrored surfaces of mirror wheel 8 in FIG. 1, and is focused to a point of the viewed image by the adjunct optical system.

Rays of the ribbon of rays make a certain horizontal angle, B, say, with optical axis 1. This "horizontal angle" is understood to be the angle the vertical projection of the ray onto the plane of FIG. 3 makes with optical axis 1. Consider now a ray through the center point of the frame after it is reflected from a mirrored surface of mirror wheel 8 in FIG. 1. Consider the horizontal angle a ray of the ribbon of rays after reflection by the mirrored surface makes with this ray. This is understood to be the angle the projection of the former ray perpendicularly onto the plane through the latter ray perpendicular to the plane of FIG. 1 makes with the latter ray. This is −B. The reflected ribbon of rays consisting of parallel rays, the horizontal distance of the image point from the center of the image is determined by this angle.

It is shown that as the point of the film advances from the top of the aperture in FIG. 1 to the bottom it produces a ribbon of rays which always make the same angle, B, the angle specified above, with optical axis 1, so that when the reflected ribbon is focused to an image point by the adjunct optical system its horizontal position does not change.

As described above under "Description of FIG. 3," as the point advances, its horizontal position is at a point of line P'P, parallel to optical axis 1. Consider what rays from light source 4 refracted by lens 5 pass through the point when it is at such a position. Since all rays from light source 4 after refraction by lens 5 are parallel to the plane of FIG. 1, these are rays (a fan of rays through the point) whose horizontal position is at 14. Thus, after refraction by imaging lens 2, they are at horizontal position 15 and make angle B with optical axis 1. And the rays at 13 are a ribbon of rays, since the point remains substantially at the focal plane of imaging lens 2.

Thus, as a point of the film advances in the aperture in FIG. 1, it produces an image point, not only whose vertical position does not vary as described above and shown in FIG. 1, but whose horizontal position does not vary as well.

RATIONALE OF THE LINE LIGHT SOURCE

As the point of the film advances, successively assuming horizontal positions at different points of line P'P in FIG. 3, the horizontal angle the point makes with optical axis 1 at point O varies. Suppose light source 4 was an ordinary two-dimensional diffuse source, that is, suppose it was other than a point in the horizontal dimension—other than a point in FIG. 3. Then the horizontal position of the image of the point would depend on this angle and would vary. This error is only avoided if the point of the film is illuminated only by rays that are in the plane in which the point moves, so that the point always produces a fan of rays in the same plane, which rays after refraction by imaging lens 2 then make the same horizontal angle with optical axis 1. That is, the film must be illuminated only by rays that are in planes parallel to the plane of FIG. 1. A source which is a point in the horizontal dimension and at the focal plane of a lens produces such an illumination. The use of such a source, which at the same time is an extended source in the vertical dimension and so produces the same illumination in that dimension as an ordinary diffuse source, is a salient feature of the invention.

SLIGHT ANAMORPHISM

Suppose a single frame fills the aperture of FIG. 1—that a frame is centered on optical axis 1 in FIG. 1. Consider a point Q of the frame (not shown in the figures) a certain horizontal distance D from the center of the frame—from optical axis 1. It has been described above under "Operation of the Invention in the Horizontal Dimension, as Shown in FIG. 3" that imaging lens 2 causes rays which have passed through point Q to make a certain horizontal angle, $A_H$, say, with optical axis 1; that after reflection by mirrored surfaces of mirror wheel 8 in FIG. 1 they make horizontal angle $-A_H$ with a ray through the center point of the frame after it is reflected; and that this angle determines the horizontal distance, Z, say, of the image of point Q from the center of the image. The absolute value of angle $A_H$ is $\tan^{-1} D/\overline{XO}$, where $\overline{XO}$ is the length of line XO in FIGS. 1 and 3.

Consider now a point Q' of the frame whose vertical distance from the center of the frame is equal to the stated distance D when the frame is flat. As described above under "Operation of the Invention in the Vertical Dimension, as Shown in FIG. 1," lens 2 causes rays which have passed through point Q' to make a certain angle (vertical angle, where "vertical angle" is understood similarly as "horizontal angle"), $A_V$, say, with optical axis 1 (and, here, with a ray through the center point of the frame which has passed through lens 2). After reflection by one of the mirrored surfaces of mirror wheel 8 in FIG. 1, they make vertical angle $-A_V$ with the stated ray after it is reflected by the mirrored surface. And this angle determines the vertical distance, $Z'$, say, of the image of point $Q'$ from the center of the image. The absolute value of $A_V$, in radians, is equal to $D/\overline{XO}$. $D/\overline{XO}$ is greater than $\tan^{-1} D/\overline{XO}$, in radians. Thus, $Z'$ is greater than $Z$.

Since the positions of image points do not change as a frame moves in the aperture of FIG. 1, the above analysis is valid no matter what the position of a frame in the aperture. Thus, the invention images points of the film with a slight expansion of the vertical distances between points as compared with the horizontal distances, the degree of this expansion depending on the position of the points in the frame. That is, the image is slightly anamorphic. This effect is too slight to be detectable by the eye.

DESCRIPTION OF FIG. 4

Figure 4:
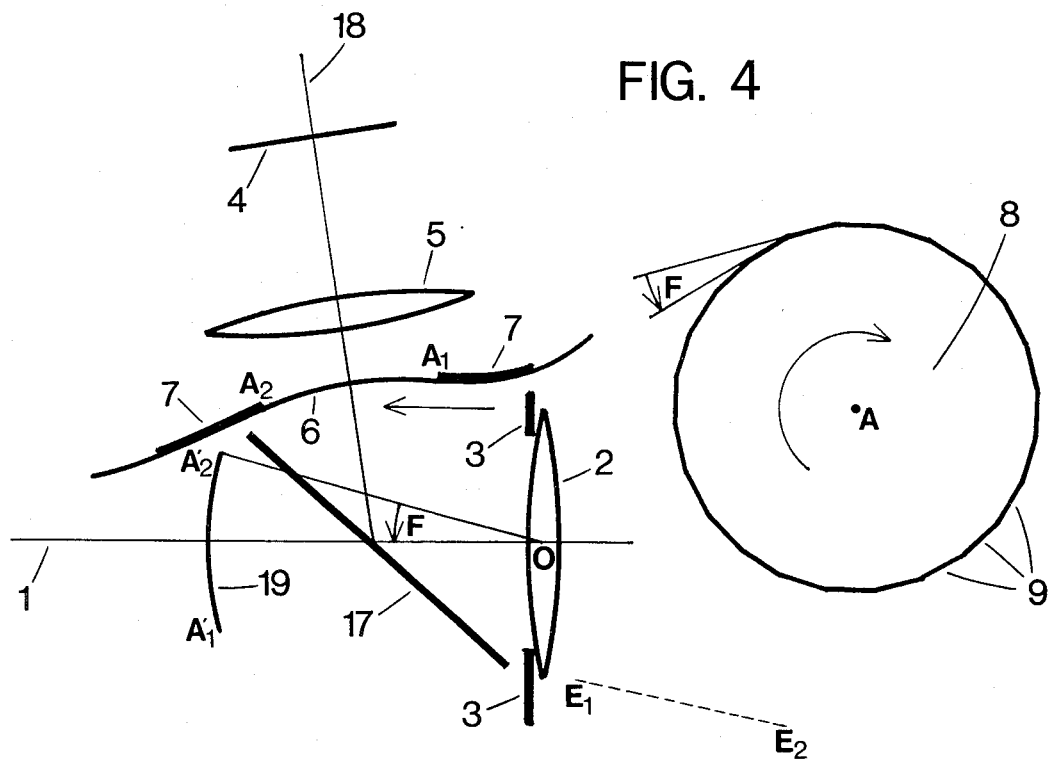
FIG. 4 shows an embodiment of the invention in which light from the motion picture film instead of directly entering the imaging lens is first reflected from a plane mirror.

FIG. 4 shows an embodiment of the invention in which light from the motion picture film is reflected from a plane mirror before entering the imaging lens. Such an embodiment may be more compact than the embodiment shown in FIG. 1, which may be desirable, or it may facilitate a configuration of components which is advantageous.

1 through 9, $A_1$, $A_2$, $E_1$, $E_2$, O, A, and F indicate the same elements as in FIG. 1. 17 is a plane mirror. 18 is the image in mirror 17 of the optical axis 1 of lens 2. $A'_1$ and $A'_2$ are the images in mirror 17 of points $A_1$ and $A_2$, respectively, and 19 is the image in mirror 17 of motion picture film 6.

The film aperture between points $A_1$ and $A_2$ is positioned in the vicinity of the image in mirror 17 of optical axis 1, 18. Points of the vertical midline of motion picture film 6 rotate in a circle such that the images in mirror 17 of the points, at 19, rotate in a circle whose center is the optical center of lens 2, O. The angle optical axis 1 makes with point $A'_2$ at O is F; that is, the image in mirror 17 of the film aperture subtends angle 2F at point O. Points of the vertical midline of motion picture film 6 rotate counterclockwise, in the direction indicated by the arrow; the images in mirror 17 of the points, at 19, rotate clockwise around point O; and mirror wheel 8 rotates clockwise.

I claim:

1. The optical system for viewing motion picture film consisting of
    a. the optical-mechanical mechanism consisting of
        (1) a first convergent lens
        (2) processed motion picture film in the standard format advancing in continuous motion at constant velocity such that points on the vertical midline of the frames of said motion picture film follow a path with the property that over an interval of said path in the vicinity of the optical axis of said first lens said points advance in a circle whose center is the optical center of said first lens; in which the length of said interval is equal to the frame height of said motion picture film; and in which, for the length of said motion picture film having said points within said interval, the curved plane of said motion picture film substantially coincides with the focal plane of said first lens
    b. a mirror wheel on the side of said first lens opposite to said motion picture film, in which
        (1) if 2F is the angle in degrees subtended by said interval at the optical center of said first lens, said mirror wheel has 360/F mirrored surfaces
        (2) said mirror wheel rotates on an axis perpendicular to the plane through said midline points of said motion picture film such that
            (A) if in a sectional view at said plane points of said motion picture film advance counterclockwise around the optical center of said first lens, said mirror wheel rotates counterclockwise, and if points advance clockwise said mirror wheel rotates clockwise
            (B) if points of said motion picture film advance with angular velocity V around the optical center of said first lens, said mirror wheel rotates with angular velocity $\frac{1}{2}V$
    c. a stop at the curved plane of said motion picture film with an aperture such that said midline points of said motion picture film within said interval lie within said aperture and those not within said interval do not lie within said aperture, such that in the course of the advance of said film every point within every frame of said film lies within said aperture for the same interval of time, and such that no two points of said film separated by a horizontal distance greater than the width of the frames of said film simultaneously lie within said aperture
    d. a film illumination system consisting of
        (1) a second convergent lens, on the side of said motion picture film opposite to said first lens, whose optical axis is parallel to the plane through said midline points of said motion picture film
        (2) a line light source parallel to the plane through said midline points of said motion picture film, intersecting the optical axis of said second lens, and in the focal plane of said second lens.

2. The optical system for viewing motion picture film consisting of
    a. the optical-mechanical mechanism consisting of
        (1) a first convergent lens
        (2) a plane mirror
        (3) processed motion picture film in the standard format advancing in continuous motion at constant velocity such that the images in said mirror of points on the vertical midline of the frames of said motion picture film follow a path with the property that over an interval of said path in the vicinity of the optical axis of said first lens said images of points advance in a circle whose center is the optical center of said first lens; in which the length of said interval is equal to the frame height of said motion picture film; and in which, for the length of said motion picture film the images of whose points in said mirror lie within said interval, the image in said mirror of the curved plane of said motion picture film substantially coincides with the focal plane of said first lens
    b. a mirror wheel on the side of said first lens opposite to said motion picture film, in which
        (1) if 2F is the angle in degrees subtended by said interval at the optical center of said first lens, said mirror wheel has 360/F mirrored surfaces
        (2) said mirror wheel rotates on an axis perpendicular to the plane through the images in said mirror of said midline points of said motion picture film such that
  (A) if in a sectional view at said plane the images in said mirror of points of said motion picture film advance counterclockwise around the optical center of said first lens, said mirror wheel rotates counterclockwise, and if the image in said mirror of points advance clockwise said mirror wheel rotates clockwise
  (B) if the images in said mirror of points of said motion picture film advance with angular velocity V around the optical center of said first lens, said mirror wheel rotates with angular velocity $\frac{1}{2}$V
c. a stop at the curved plane of said motion picture film with an aperture such that the images of points of said film within said interval are images of points which lie within said aperture and those not within said interval are images of points which do not lie within said aperture, such that in the course of the advance of said film every point within every frame of said film lies within said aperture for the same interval of time, and such that no two points of said film separated by a horizontal distance greater than the width of the frames of said film simultaneously lie within said aperture
d. a film illumination system consisting of
  (1) a second convergent lens, on the side of said motion picture film opposite to said mirror, whose optical axis is parallel to the plane through said midline points of said motion picture film
  (2) a line light source parallel to the plane through said midline points of said motion picture film, intersecting the optical axis of said second lens, and in the focal plane of said second lens.

* * * * *